(12) United States Patent
Ulherr

(10) Patent No.: US 9,715,969 B2
(45) Date of Patent: Jul. 25, 2017

(54) ELECTROLYTIC CAPACITOR MODULE WITH HIGH RESISTANCE TO VIBRATION

(71) Applicant: CONTI TEMIC MICROELECTRONIC GMBH, Nuremberg (DE)

(72) Inventor: Marcus Ulherr, Schwarzenbruck (DE)

(73) Assignee: Conti Temic mircoelectronic GmbH, Nuremberg (DE)

(*) Notice: Subject to any disclaimer, the term of this patent is extended or adjusted under 35 U.S.C. 154(b) by 140 days.

(21) Appl. No.: 14/441,594

(22) PCT Filed: Nov. 4, 2013

(86) PCT No.: PCT/DE2013/200271
§ 371 (c)(1),
(2) Date: May 8, 2015

(87) PCT Pub. No.: WO2014/071942
PCT Pub. Date: May 15, 2014

(65) Prior Publication Data
US 2015/0287539 A1    Oct. 8, 2015

(30) Foreign Application Priority Data
Nov. 8, 2012   (DE) .................. 10 2012 110 684

(51) Int. Cl.
*H01G 9/06* (2006.01)
*H01G 9/08* (2006.01)
(Continued)

(52) U.S. Cl.
CPC ............ *H01G 9/08* (2013.01); *H01G 9/0029* (2013.01); *H01G 9/06* (2013.01); *H01G 9/151* (2013.01); *Y10T 29/417* (2015.01)

(58) Field of Classification Search
CPC ....................................................... H01G 9/06
See application file for complete search history.

(56) References Cited

U.S. PATENT DOCUMENTS 3,277,350 A    10/1966   Pearce et al.
6,265,840 B1    7/2001   Wiezorek et al.
(Continued)

FOREIGN PATENT DOCUMENTS

DE    19857840 A1    7/2000
DE    10332093 A1    2/2005
(Continued)

*Primary Examiner* — Eric Thomas
(74) *Attorney, Agent, or Firm* — Laurence A. Greenberg; Werner H. Stemer; Ralph E. Locher

(57) ABSTRACT

An electrolytic capacitor module for installation in a housing of a motor vehicle control device, a method for producing an LC module and a corresponding motor vehicle control device with an electrolytic capacitor module. The electrolytic capacitor module includes a cylindrical electrolytic capacitor with a capacitor can and a cover at each end of the can. The covers secure a capacitor winding inside the capacitor can. The electrolytic capacitor module also has a support plate with a chamber for accommodating the electrolytic capacitor. The capacitor can has at least one opening and, on the inside of the electrolytic capacitor, the interstice between the inner wall of the capacitor can and the capacitor winding is at least partially filled with casting compound. The capacitor is at least partially surrounded by the same casting compound on the outside thereof in the region of the chamber.

7 Claims, 2 Drawing Sheets

(51) Int. Cl.
*H01G 9/15* (2006.01)
*H01G 9/00* (2006.01)

(56) References Cited

U.S. PATENT DOCUMENTS

| | | |
|---|---|---|
| 6,717,797 B1 | 4/2004 | Martin et al. |
| 6,885,538 B1 | 4/2005 | Ishii et al. |
| 2006/0168787 A1 | 8/2006 | Will |
| 2011/0168475 A1* | 7/2011 | Moser .................... B60R 21/01 |
| | | 180/271 |

FOREIGN PATENT DOCUMENTS

| | | |
|---|---|---|
| DE | 102004047302 A1 | 10/2005 |
| EP | 1424708 A1 | 6/2004 |
| JP | H06208935 A | 7/1994 |
| JP | 2005268727 A | 9/2005 |
| JP | 2007019136 A | 1/2007 |
| JP | 2007227696 A | 9/2007 |
| JP | 2009094266 A | 4/2009 |
| JP | 2011222909 A | 11/2011 |

\* cited by examiner

ELECTROLYTIC CAPACITOR MODULE WITH HIGH RESISTANCE TO VIBRATION

BACKGROUND OF THE INVENTION

Field of the Invention

The invention relates to an electrolytic capacitor module, in particular for installation in a housing of a motor-vehicle control device, comprising a cylindrical electrolytic capacitor having a capacitor can and two covers which are in each case arranged at one end of the capacitor can and which fix a capacitor winding in the interior of the capacitor can, and comprising a support plate having a chamber for accommodating the electrolytic capacitor, to a method for producing said electrolytic capacitor module as claimed, and also to a motor-vehicle control device comprising an electrolytic capacitor module according to the invention as claimed.

It is now customary in motor-vehicle engineering to integrate control devices for motors or transmissions in the motor-vehicle assembly which is to be controlled, in particular the motor or transmission. The transmission control devices primarily form, as local control devices, an extremely compact unit. In comparison to the conventional use of external control devices, this arrangement has enormous advantages in respect of quality, costs, weight and functionality. In particular, said arrangement results in a considerable reduction in plug connections and lines, and therefore possible causes of failure.

The integration of the control device into the transmission places high demands on the thermal and mechanical load bearing capacity of said transmission. Functionality has to be ensured both over a wide temperature range (approximately −40° C. to 150° C.) and under extreme mechanical vibrations (up to 40 g).

In the automotive sector, electrolytic capacitors, amongst others, preferably in the form of charging capacitors in a DC circuit, for example in rectifier circuits, are used in local control devices.

In particular, cylindrical electrolytic capacitors with a large structure have an increased failure rate under high vibration loadings. An electrolytic capacitor is a polarized capacitor comprising two layers in the form of capacitor plates and a dielectric which is situated between them. One layer is a metal foil, in particular an aluminum foil, and forms the anode. The other layer is the electrolyte, an electrically conductive liquid on an absorbent material, and forms the cathode. The dielectric between the layers is a thin oxide layer which is located on the surface of the metal foil. A further aluminum foil serves in order to make contact with the electrolytic layer. Electrolytic capacitors are winding capacitors which are provided, in particular, in can form with radial connection wires (both connections at one end) and axial connection wires (in each case one connection at each end).

One cause of failure when vibrations occur, for example due to a rapidly rotating mass in the motor or transmission, is that the solder connections between the connection wires of the electrolytic capacitor and, for example, a printed circuit board outside the capacitor come loose.

A further reason for the failure of an electrolytic capacitor on account of vibration loadings is its internal structure. The winding of the electrolytic capacitor is held, or axially braced, in the capacitor can at each end, in particular by a cover. Depending on the structure, one connection wire is arranged on each cover, or both connection wires are arranged on one cover. The connection wires are electrically connected, for example welded, to the winding. In the event of severe vibrations, there is a risk of the winding moving relative to the surrounding can. In the worst case, the electrical connection between the winding and the connection wires in the interior of the electrolytic capacitor comes loose in the process. This likewise leads to failure of the electrolytic capacitor.

BRIEF SUMMARY OF THE INVENTION

One object of the present invention is therefore to provide an electrolytic capacitor module which, under vibration loading, protects the electrical connections of the connection wires of the electrolytic capacitor against damage both in respect of making contact outside the capacitor and also in respect of the capacitor winding in the interior of the capacitor.

According to the invention, this object is achieved by an electrolytic capacitor module as claimed. Advantageous developments are the subject matter of the dependent claims.

According to the invention, the capacitor can of the electrolytic capacitor has at least one opening, wherein, in the interior of the electrolytic capacitor, the intermediate space between the inner wall of the capacitor can and the winding of the electrolytic capacitor is at least partially filled with casting compound. This prevents the capacitor winding from being able to move relative to the surrounding capacitor can, and prevents the electrical connection between the winding and the connection wires from coming loose.

Furthermore, the electrolytic capacitor is arranged in a chamber in the electrolytic capacitor module in such a way that the outside of the electrolytic capacitor is at least partially surrounded by the same casting compound as the winding in the interior of the electrolytic capacitor in the region of the chamber. This prevents the electrical connections between the connection wires of the electrolytic capacitor with contact-connections outside the capacitor can coming loose when vibrations occur, for example caused by rapidly rotating parts in the motor or transmission.

Depending on the application, the opening in the capacitor can can be in the form of a slot or in the form of a substantially circular opening. It is also possible for several openings to be arranged in the capacitor can, wherein in this case one preferably serves as an inlet opening and one preferably serves as a ventilation opening, and, in particular, the ventilation opening is situated higher than the inlet opening relative to the filling height of the casting compound in the chamber of the module.

The chamber in the electrolytic capacitor module advantageously has throughplated holes which allow electrical connection between connection wires of the electrolytic capacitor and components outside the electrolytic capacitor module.

The plated-through holes can be selectively arranged on the inner surface or outer surface of the chamber.

A further object of the present invention is to provide a method for producing an electrolytic capacitor module as claimed.

According to the invention, this object is achieved by a method as claimed.

The method according to the invention comprises the steps of:

a) providing a support plate, which comprises a chamber, and an electrolytic capacitor, b) inserting the electrolytic capacitor into the chamber in the support plate, c) electrically connecting the connection wires of the electrolytic capacitor to the plated-through holes, d) filling the chamber with a casting compound until the outside of the electrolytic capacitor is at least partially surrounded by the casting compound, and, in the interior of the electrolytic capacitor, at least partially filling the intermediate space between the inner wall of the capacitor can and the winding with the same casting compound, and e) curing the casting compound, for example by means of UV radiation.

In an alternative method, the casting compound is initially poured into the chamber in the electrolytic capacitor module, the electrolytic capacitor is inserted into the chamber, and then the connection wires of the electrolytic capacitor are electrically connected to the throughplated holes. This alternative method has the advantage that the filling level of the casting compound in the chamber can be better controlled.

The two methods ensure that some of the casting compound in the chamber in the support plate flows into the interior of the electrolytic capacitor through an opening in the capacitor can of the electrolytic capacitor, and at least partially fills the intermediate space between the inner wall of the capacitor can and the capacitor winding with casting compound. After the casting compound has cured, the capacitor winding is fixed and as a result the capacitor winding is prevented from being able to move relative to the surrounding capacitor can, and the electrical connection between the winding and the connection wires is prevented from coming loose under vibration loading.

The electrolytic capacitor module is preferably installed in motor-vehicle control devices, wherein the support plate of the electrolytic capacitor module is connected to the housing of the control device in an interlocking or force-fitting manner, for example by means of a screw or a rivet.

BRIEF DESCRIPTION OF THE SEVERAL VIEWS OF THE DRAWING

In the following description, the features and details of the invention will be explained in greater detail in connection with the appended drawings with reference to exemplary embodiments. Here, features and relationships described in individual variants can, in principle, be transferred to all exemplary embodiments. In the drawings.

DESCRIPTION OF THE INVENTION

Figure 1:
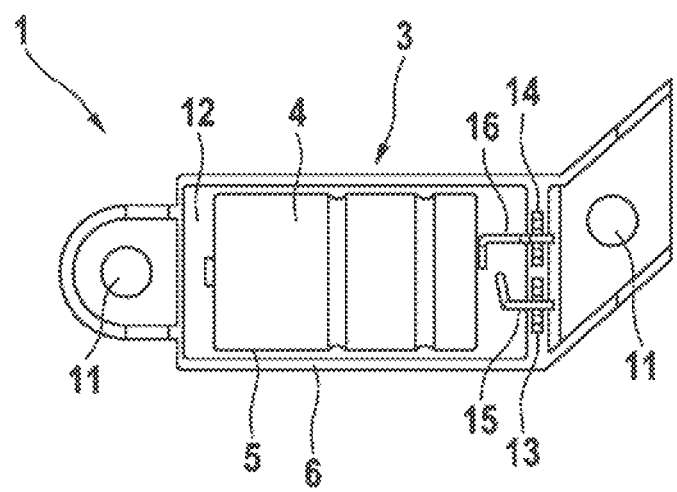
FIG. 1 shows a plan view of the electrolytic capacitor module.

FIG. 1 shows an electrolytic capacitor module 1 for installation in a housing 2 in a motor-vehicle control device, in particular what is known as a local control device. The electrolytic capacitor module 1 substantially comprises a cylindrical electrolytic capacitor 4 comprising a capacitor can 5 and a support plate 3 having a chamber 6 which is filled with a curable casting compound 8. The electrolytic capacitor 4 is arranged in the chamber 6 in such a way that the outside of said electrolytic capacitor is at least partially surrounded by the casting compound 12 in the region of the chamber 6.

The connection wires 15, 16 of the electrolytic capacitor 4 are electrically connected, for example welded or soldered, to throughplated holes 13, 14 which are integrated into a wall of the chamber 6 here. This allows an electrical connection between connection wires 15, 16 of the electrolytic capacitor 4 and components outside the electrolytic capacitor module 1. However, the plated-through holes 13, 14 can also be arranged on an outer surface of the chamber 6.

A fastening apparatus in the form of an aperture 11 is arranged in the support plate 3, in particular in each case on two opposite sides in the region of the chamber 6. The electrolytic capacitor module 1 can be connected to the housing 2 of the control device in an interlocking or force-fitting manner, for example by means of a screw or a rivet, by means of this aperture 11.

Figure 2A:
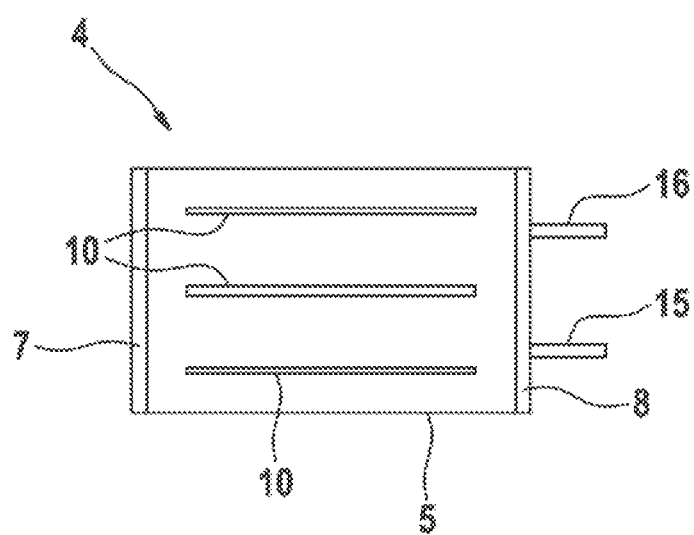
FIG. 2a shows an electrolytic capacitor with slot-like openings.
Figure 2B:
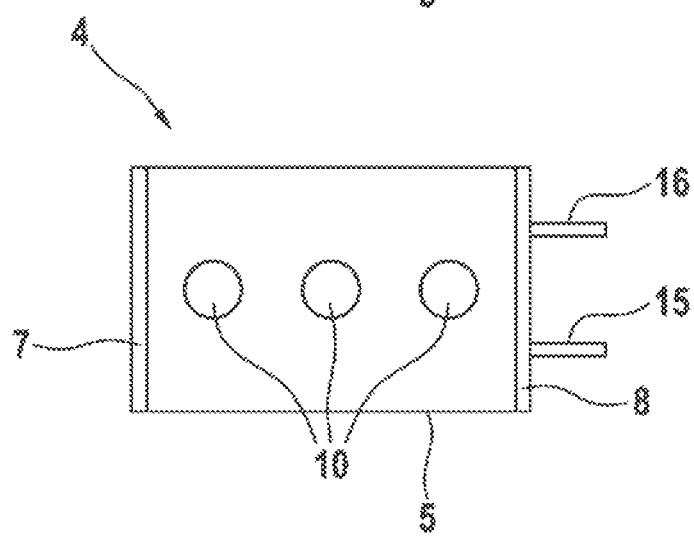
FIG. 2b shows an electrolytic capacitor with circular openings.

FIGS. 2a and 2b each show a cylindrical electrolytic capacitor 4 comprising a capacitor can 5 and two covers 7, 8 which are in each case arranged at one end of the capacitor can 5 and which fix a capacitor winding 9, not shown here, in the interior of the capacitor can 5. In this case, the connection wires 15, 16 are arranged at an end of the capacitor can 5. However, it is also possible for in each case one connection wire 15, 16 to be arranged at each end. In FIG. 2a, the capacitor can 5 has three slot-like openings 10, and in FIG. 2b the capacitor can 5 has three circular openings 10. However, the openings 10 could also be of a different shape, for example in the form of an ellipse.

Figure 3:
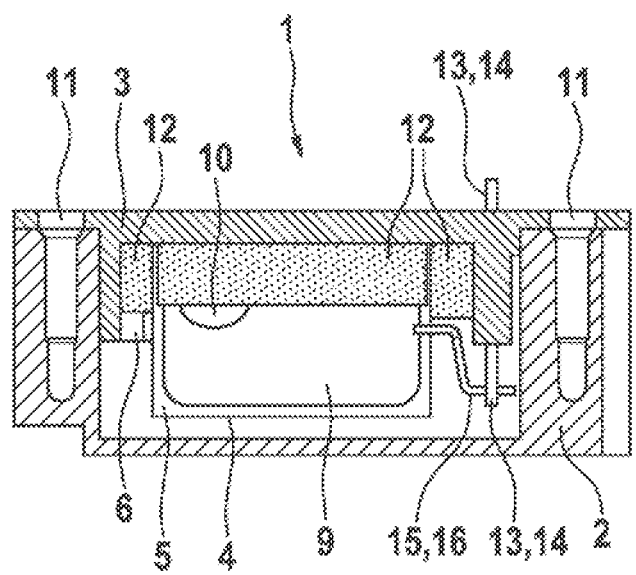
FIG. 3 shows a section through the electrolytic capacitor module and a detail of the housing.

A single opening 10 would also suffice in order to allow casting compound 12 to flow out of the chamber 6 into the interior of the electrolytic capacitor 4. In particular, when there is more than one opening 10, one opening can serve as a ventilation opening and therefore accelerate the rate at which casting compound 6 flows into the interior of the electrolytic capacitor 4. FIG. 3 shows a section through the electrolytic capacitor module 1 and a housing 2 of a control device, which housing is connected to the electrolytic capacitor module 1 and wherein only a detail of the housing 2 is illustrated. The outside of the electrolytic capacitor 4 is at least partially surrounded by casting compound 12 in the region of the chamber 6. As already mentioned further above, this, in particular, prevents the electrically conductive connections between the connection wires 15, 16 of the electrolytic capacitor 4 and the throughplated holes 13, 14 in the chamber 6 being damaged when vibrations occur.

Casting compound 12 can flow out of the chamber 6 into the interior of the electrolytic capacitor 4 through the opening 10 in the capacitor can 5 of the electrolytic capacitor 4 and at least partially fill the intermediate space between the inner wall of the capacitor can 5 and the capacitor winding 9 of the electrolytic capacitor 4 with casting compound 12. As already mentioned, this prevents the capacitor winding 9 from being able to move relative to the surrounding capacitor can 5 and prevents the electrical connection between the winding 9 and the connection wires 15, 16 from coming loose.

As already described in FIG. 1, a fastening apparatus in the form of an aperture 11 is arranged in the support plate 3, in particular in each case on two opposite sides in the region of the chamber 6. The electrolytic capacitor module 1 can be connected to the housing 2 of the control device in an interlocking or force-fitting manner, for example by means of a screw or a rivet, by means of this aperture 11.

The space between the electrolytic capacitor 4 and the housing 2 can optionally be filled with thermally conductive paste. This serves, firstly, in particular as a further measure for vibration damping, and secondly the heat which is produced in the electronic component is dissipated to the housing in this way.

LIST OF REFERENCE SYMBOLS

1 Electrolytic capacitor module
2 Housing of a motor-vehicle control device
3 Support plate
4 Electrolytic capacitor
5 Capacitor can
6 Chamber
7, 8 Cover
9 Capacitor winding
10 Opening in the capacitor can
11 Fastening apparatus
12 Casting compound
13, 14 Throughplated holes in the chamber
15, 16 Connection wires of the electrolytic capacitor

The invention claimed is:

1. An electrolytic capacitor module, comprising:
a cylindrical electrolytic capacitor having a capacitor can and two covers respectively disposed at an end of said capacitor can and fixing a capacitor winding in an interior of said capacitor can;
a support plate formed with a chamber for accommodating said electrolytic capacitor;
said capacitor can having at least one opening formed therein and an intermediate space, in an interior of said electrolytic capacitor, between an inner wall of said capacitor can and said capacitor winding; and
a casting compound at least partially filling said intermediate space and an outside of said electrolytic capacitor between said capacitor can and said chamber.

2. The electrolytic capacitor module according to claim 1, configured for installation in a housing of a motor-vehicle control device.

3. The electrolytic capacitor module according to claim 1, wherein said opening is a slot or a substantially circular opening.

4. The electrolytic capacitor module according to claim 1, wherein said chamber is formed with through-plated holes, enabling an electrical connection between connecting wires of said electrolytic capacitor and components outside the electrolytic capacitor module.

5. A method of producing an electrolytic capacitor module according to claim 1, the method comprising:
a) providing the support plate with the chamber, and the electrolytic capacitor with the can an the winding in the can;
b) inserting the electrolytic capacitor into the chamber in the support plate;
c) electrically connecting connection wires of the electrolytic capacitor to throughplated holes;
d) filling the chamber with the casting compound until the outside of the electrolytic capacitor is at least partially surrounded by the casting compound, and, in an interior of the electrolytic capacitor, at least partially filling the intermediate space between the inner wall of the capacitor can and the winding with the same casting compound; and
e) curing the casting compound.

6. A method of producing an electrolytic capacitor module according to claim 1, the method comprising:
a) providing the support plate and the electrolytic capacitor;
b) filling the chamber formed in the support plate with the casting compound;
c) inserting the electrolytic capacitor into the chamber so that an exterior of the electrolytic capacitor is at least partially surrounded by the casting compound, and so that, in the interior of the electrolytic capacitor, the intermediate space between the inner wall of a capacitor can and the winding is at least partially filled with the same casting compound;
d) electrically connecting connection wires of the electrolytic capacitor to plated-through holes; and
e) curing the casting compound.

7. A motor-vehicle control device, comprising:
a control device housing; and
the electrolytic capacitor module according to claim 1, wherein the support plate of the electrolytic capacitor module is connected to said control device housing with an form-locking connection or with a force-locking connection.

* * * * *